United States Patent [19]

Mamery

[11] Patent Number: 4,838,389
[45] Date of Patent: Jun. 13, 1989

[54] PROTECTIVE DEVICE FOR DRUM-BRAKE OPERATING SHAFT

[76] Inventor: Gaby Mamery, Lousy-sur-Marne, 51300 Vitry-le-Francois, France

[21] Appl. No.: 72,989

[22] Filed: Jun. 23, 1987

[30] Foreign Application Priority Data

Jun. 24, 1986 [FR] France ................................ 86 09245

[51] Int. Cl.⁴ ...................... B65D 53/00; F16D 65/22; F16D 65/30
[52] U.S. Cl. .................................. 188/78; 188/205 R; 188/325; 188/382; 384/276; 384/286; 384/322
[58] Field of Search .................................. 464/170–178, 464/179; 74/63, 567, 595, 594; 188/382, 325–343, 264 B, 206, 205, 74, 78; 384/150–152, 276–293, 322, 276, 422, 397

[56] References Cited

U.S. PATENT DOCUMENTS

| | | | |
|---|---|---|---|
| 2,886,141 | 5/1959 | House | 188/78 |
| 2,892,662 | 6/1959 | Scheel | 188/205 R X |
| 2,923,579 | 2/1960 | Scheel | 188/205 R X |
| 3,020,099 | 2/1962 | Smith | 384/276 X |
| 3,076,531 | 2/1963 | Hanley et al. | 188/205 R |
| 3,102,759 | 9/1963 | Stewart | 384/276 |
| 3,149,887 | 9/1964 | Moyer | 384/276 X |
| 3,279,569 | 10/1966 | Kieser et al. | 188/206 A |
| 3,313,579 | 4/1967 | Seidenfeld | 384/150 |
| 4,307,921 | 12/1981 | Roberts | 384/288 X |
| 4,311,349 | 1/1982 | Roberts | 384/288 |
| 4,488,826 | 12/1984 | Thompson | 384/288 |
| 4,576,488 | 3/1986 | Steiner et al. | 384/322 X |
| 4,601,590 | 6/1986 | Arii et al. | 384/286 X |

FOREIGN PATENT DOCUMENTS 0098906 1/1984 European Pat. Off. .
2497891 7/1982 France ................................ 384/397

*Primary Examiner*—Douglas C. Butler
*Attorney, Agent, or Firm*—Horst M. Kasper

[57] ABSTRACT

The invention relates to a protective device of drum-brake operating shafts of trucks and touring trailers. This device is essentially constituted by a protective sleeve (4) mounted on the bushing (5) of the operating shaft (1) of the clearance cam (3) of the brake shoes. This sleeve (4), extended up to the operating lever (2), comprises a packing (6) at each one of the extremities of its bore. The axis of the bore (4d) is upwardly offset in relation to the axis of the sleeve (4), of a distance X corresponding to one half of the clearance arranged between the shaft (1) and the bore (4d). A sectoral wearing plate (10) is disposed at the lower portion of the bore (4d). The sleeve (4) is mounted at the connecting bridge (8) by an annular collar (4a) with an indexing key (4b) and of the housing (9), existing at the beginning, or of a tab molded with the sleeve (4).

16 Claims, 2 Drawing Sheets

PROTECTIVE DEVICE FOR DRUM-BRAKE OPERATING SHAFT

The invention relates to the protective devices of drum-brake operating shafts of trucks or of touring trailers.

On the actuating devices of drum-brakes of trucks or trailers most widely used, the cam, serving to separate the brake-shoes, is actuated by means of a shaft, a lever, and a gear. The shaft is held in position by two sleeve bearings, respectively attached to the axle and of the bridge. The lubrication of the bearings is carried out by grease, at the time of mounting and in maintenance operations of the braking system. The operating-shaft sections situated between the bushings, as well as the inner face of the latter, are constantly subjected to the projections of water and solid particles.

The projections of water and of sand eventually cause their penetration into the bushings, between the shaft and the sleeves, where they mix with the grease, resulting in the formation of some sort of abrasive paste and provoking a jamming of the sleeves on the shaft. This jamming results in a drag in the revolution of the sleeves in relation to the bushings. This rotation being executed without any lubrication, a considerable clearance does not take long to appear; the more so since the space left between the sleeves and the bushings fills itself with sand and water. The fact that the shaft does not execute one full rotation and that the latter is always stressed in the same direction by the cam and the lever brings about a localization of wear in one particular sector. This brings about a misalignment of the shaft in relation to the axis of the bushings and a sometimes considerable dislocation of the operating cam of the brake-shoes in relation to the plane of symmetry of the drums.

Different devices already exist that aim at making the position of the brake-shoes vary in relation to the drum in order to maintain a suitable clearance between the brake lining and the drum: the most generally accepted consisting in mounting the joint pivots of the shoes on an eccentric.

Such devices aspire essentially to compensate for an excessive clearance between shoes and drum-brakes resulting from a normal wear of the lining, and not to avoid or to compensate for a transverse displacement of the control cam of the shoes, due to the jamming of the bushing jackets on the operating shaft of the cam and to the displacement of these on their bushing.

The protective device in accordance with the invention has as its object the prevention the jamming of the bushing jackets on the operating shaft of the control cam of the brake-shoes and to eliminate any risk of polluting the grease with water and solid particles.

There is already known a device corresponding to the preamble of claim 1 (European Patent Application EP-A-0,098,906). The operating shaft of the control cam of the brake-shoes is mounted in a tubular housing, serving as a grease reserve, equipped at each extremity with sleeves outfitted with packings, a lubricator, and one or several pressure reliefs. The extremity of the sleeve situated on the can side is inserted in one bushing attached to the axle, instead of the original jacket, and the sleeve situated on the operating lever side has an annular collar designed to be lodged in a two-part housing fixed at the connecting bridge of the wheels of the same chassis. The protective tubular housing and the sleeves are made out of one single piece, of plastic material.

Taking into account the manufacture of the two sleeves of plastic material, the limited length of the latter, and the sectorial displacement of the operating shaft, the sleeves wear fairly rapidly in the sections in question: this translates itself into an increase in clearance. The sleeve situated on the side of the operating level is linked at the wheel connecting bridge by means of the two-part housing, as usual: which obliges one to provide the said sleeve with an annular collar of appropriate dimensions.

The present invention has as its object to obviate these inconveniences. This invention, as it is characterized in the claims, solves the problem by creating a protective device of the operating shaft of the control cam of the drum-brake shoes that will be simple, effective and reliable.

The device in accordance with the invention is mainly characterized in that it constitutes a lengthening of the bushing sleeve of the operating shaft, situated on the cam side, up to the actuating lever of the operating shaft. The bore of said sleeve is provided, at each one of its extremities, with a packing and comprises a lubricator, an overflow opening and a mounting means at the connecting bridge of the axles.

The bore of the sleeve is upwardly offset by a distance X equal to one half of the clearance provided between the operating shaft and the bore of the sleeve. This clearance amounts to about 1 mm.

The bore of the sleeve comprises, over its entire length, a wearing plate covering a segment corresponding to the angular clearance of the operating cam of the brakeshoes and, externally, at the level of the bushing and over its entire circumference, a reinforcement shell of a length slightly greater than that of the bushing. The wearing plate and the shell comprise multiple perforations facilitating their attachment to the sleeve during molding.

According to a first mode of realization of the invention, the sleeve is externally equipped, at its extremity situated on the operating lever side of the shaft, with an annular collar and a key facilitating its indexing, while mounting, with regard to the two-part housing insuring, from the beginning, the connection with the bridge.

The sleeve, the wearing plate, the lubricator, and the indexing key have a common plane of symmetry, the wearing plate, the lubricator, and the key being situated at the lower portion of the sleeve.

According to a second preferred mode of realization of the invention, the attaching means of the sleeve, at the connecting bridge of the wheels, is constituted by a tab, molded with the sleeve, situated at the lower portion and in the plane of symmetry of the latter.

The resultant advantages, thanks to this invention, consist essentially in that the control cam of the brake-shoes maintains its ideal position, even after many numerous stresses, regardless of the ambient conditions as well as of the nature and the amount of the projections received by the operating device; this permits the use of only one reduced air pressure to actuate the two brake-shoes and to obtain a perfect braking synchronization on all of the wheels, as well as a great flexibility in braking.

Other characteristics and advantages will become apparent in the following description of a device in accordance with the invention given by way of a nonlimiting example with regard to the annexed drawings, in which.

Figure 1:
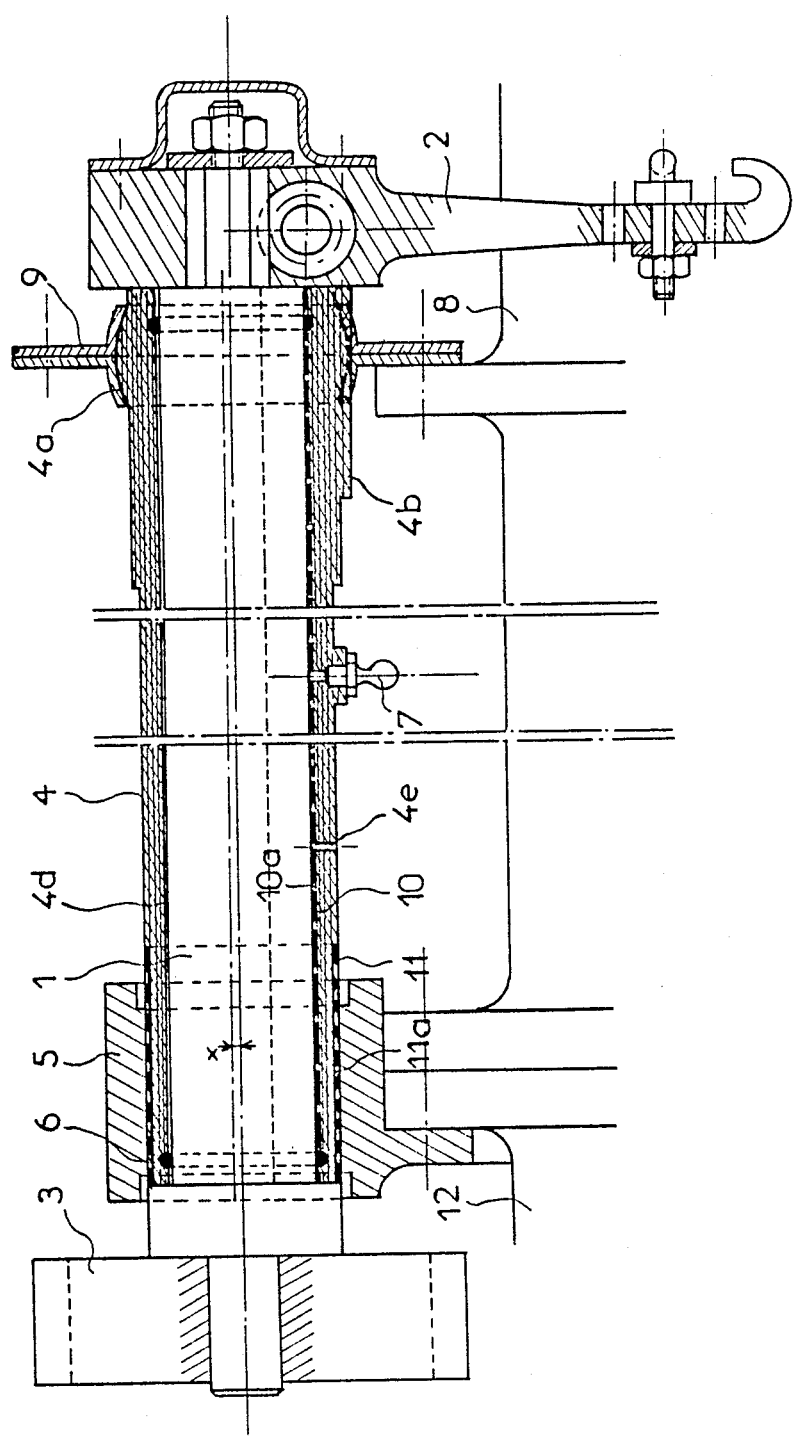
FIG. 1 represents a longitudinal sectional view of the mounted device.

The figures represent a protective device of the operating shaft 1, of the control cam 3 of the drum-brake shoes, essentially constituted by one long sleeve 4, mounted in the bushing 5, surrounding the shaft 1 up to the actuating lever 2. This sleeve 4 is equipped at the inside, at each one of its extremities, with one packing 6. The packing comprises, at its lower portion, a lubricator 7 and an overflow opening 4e and, at its extremity opposite to the cam 3, an annular collar 4a and an indexing key 4b, insuring the mounting at the bridge 8 by means of the housing 9, or of one tab 4c insuring the same function. The sleeve 4 is outfitted, over its entire length, with a sectored wearing plate 10 having multiple perforations 10a and, at the level of the bushing, with a peripheral reinforcement jacket 11 having multiple perforations 11a.

Figure 2:
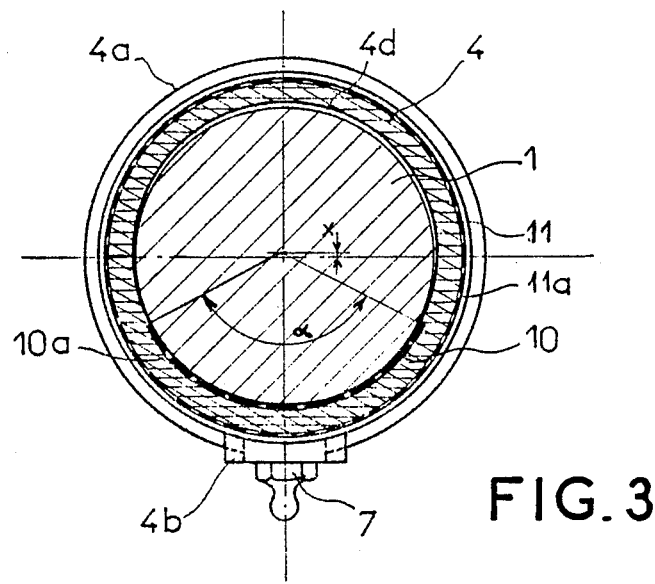
FIG. 2 represents a transverse sectional view of the device.

While examining FIGS. 1 and 2, one can note that the sleeve 4, mounted in the bushing 5 attached to the axle 12, is extended up to the actuating, lever 2 in order to completely protect the operating shaft 1, taking into account that the bore 4d of this sleeve 4 is equipped, at each one of its extremities, with a packing 6.

In order to avoid a premature and localized wear of the sleeve 4, taking into account the limited clearance of the cam 43, the bore 4d of the sleeve 4 comprises, over its entire length, over a section corresponding to the clearance angle alpha α of the cam 3, an over-coated wearing plate, by means of multiple perforations 10a, at the time of the injection of the plastic material used for the manufacture of the protective sleeve 4.

In order to compensate for the prior wear of the bushing 5, the sleeve 4 is outfitted at its periphery, on the side of the bushing 5, over a length greater than the length of the bushing, with an over-coated jacket or a semijacket 11, at the time of the injection of the sleeve 4, by means of multiple perforations 11a.

To permit the lubrication, and to avoid any locking of the protective sleeve 4 on the shaft 1 under the temperature effect, a clearance of about 1 mm is provided between the operating shaft 1 and the bore 4d of the sleeve 4 which necessitates an upward offsetting X, of the bore 4d in relation to the axis of the sleeve 4, corresponding to half the clearance; in order for the operating shaft 1 to be maintained in the axis of the bushing 5, notwithstanding the clearance existing between this axis 1 and the bore 4d of the sleeve 4. Keeping in mind the offsetting, it is important that the sleeve 4 be positioned well angularly at the time of mounting, moreover, the lubricator 7 and the indexing key 4b, or the fixing tabe 4c at the connecting bridge of the axles 12, they are to be, at the time of manufacture, situated exactly in the plane of symmetry of the sleeve 4, at the lower portion of the latter. The sleeve 4 comprises an overflow opening 4e allowing for the elimination of excess grease.

Figure 3:
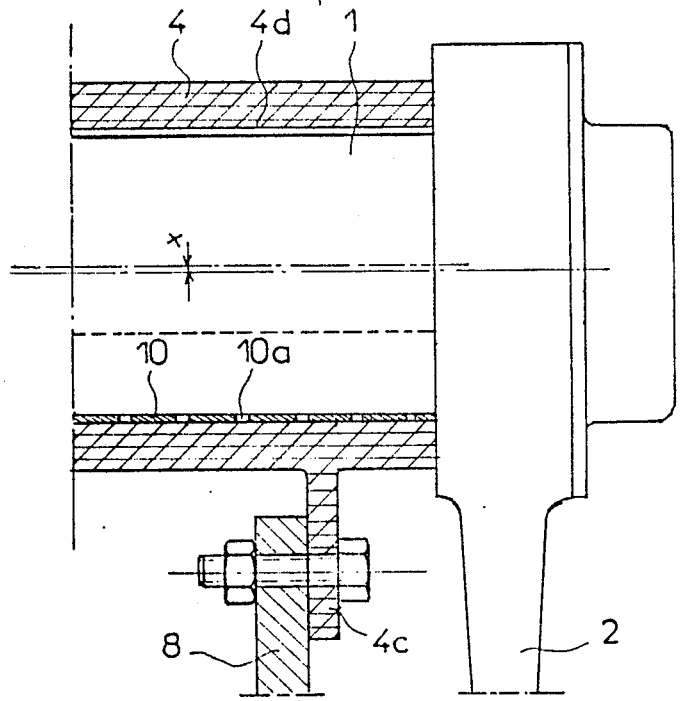
FIG. 3 represents a partial longitudinal sectional view of the device showing its attached means at the connecting bridge of the two wheels.

As one can gather when comparing the FIGS. 1 and 3, the sleeve 4 is mounted at the bridge 8 by means of the annular collar 4a and of the two-part housing 9, existing at the beginning or, preferably, by means of a tab 4c, molded with the sleeve 4 and situated at the lower portion of the latter which offers, moreover, the advantage to ensure a direct indexing of the sleeve.

The protective device according to the invention can be used on most vehicles equipped with drum-brakes of which the control cam of the brake-shoe is operated remotely by means of a shaft, a lever, and a linkage.

Interesting applications exist on trucks, trailers, agricultural equipment, and vehicles having all kinds of wheels, frequently used on roadways, race tracks (runways), or any terrain. In the context of the present invention heavy duty motor vehicles and heavy duty vehicles include trucks and touring trailers.

I claim:

1. Protective device of an operating shaft (1) of a control cam (3) of drum-brake shoes of heavy duty vehicles characterized in that the protective device is constitute by a lengthening of a sleeve (4) of the bushing (5) of an operating shaft (1) up to an actuating lever (2) of the operating shaft (1), in that a bore (4d) of this sleeve (4) is equipped, at each one of its extremities, with a packing 6 and in that it comprises a lubricator (7), an overflow opening (4e), and a means for mounting at a connection bridge (8) of axles (12) and wherein the bore (4d) of the sleeve (4) is upwardly offset by a distance X equal to half of the clearance existing between the operating shaft (1) and the bore (4d) of the sleeve (4), wherein the mounting means of the protective device at the connecting bridge (8) of the axles (12) is constituted by an annular collar (4a) and an indexing key (4b) situated on the side and in proximity of the actuating lever (2) and of the connecting two-part housing (9) existing at the beginning; and wherein the wearing plate (10), the lubricator (7), the indexing key (4b) of the sleeve (4) are situated at the lower portion of the sleeve (4), in relation to the mounting housing (9) and the tab (4c) of direct mounting to the sleeve (4) at the connecting bridge (8) of the axles (12).

2. Protective device in accordance with claim 1, characterized in that the clearance existing between the operating shaft (1) and the bore (4d) of the sleeve (4) is of about 1 mm.

3. Protective device in accordance with claim 1, characterized in that the sleeve (4) comprises, inwardly and over its entire length, a wearing plate (10) covering a portion corresponding to the angular clearance alpha α of the operating cam (3) of the brake shoes and, outwardly, at the level of the bushing and over its entire circumference, a reinforcing jacket (11) having a length slightly greater than the length of the bushing (5).

4. Protective device according to claim 3, characterized in that the wearing plate (10) and the reinforcing jacket (11) of the sleeve (4) are equipped with multiple perforations (10a, 11a) permitting their attachment to the sleeve (4) by over-coating at the time of molding of the latter.

5. Protective device according to claim 3, characterized in that the sleeve (4), the wearing plate (10), the lubricator (7), and the indexing key (4b) of the sleeve (4) have a common plane of symmetry in relation to the fixing two-part housing (9).

6. Protective device according to claim 3, characterized in that the sleeve (4), the wearing plate (10), the lubricator (7), and the mounting tab (4c) have a common plane of symmetry at the connecting bridge (8) of the axles (12).

7. Protective device according to claim 1, characterized in that the mounting means of the protective device at the connecting bridge (8) of the axles (12) is constituted by a tab (4c) which is an integral part of the sleeve (4).

8. Protective device for an operating shaft of a control cam of drum-brake shoes of heavy duty vehicles comprising a bushing having an inner side; an operating shaft having an end section; an actuating lever attached to the end section of the operating shaft; a sleeve having an extension up to the actuating lever of the operating shaft and having an outer side fitted with the outer side into the inner side of the bushing and having an inner bore with the bore having two end sections; a packing furnished at each of the end sections of the bore; a lubricator disposed at the sleeve; an overflow opening disposed at the sleeve; means for mounting a connecting bridge of axles, which means is disposed at the sleeve; wherein the bore of the sleeve has a center axis and wherein the shaft has a middle axis and wherein the center axis is upwardly offset relative to the middle axis by a distance X substantially equal to one half of a clearance existing between the operating shaft and the bore of the sleeve; an actuating lever attached to the shaft; a connecting two-part housing disposed near an end of the shaft; first means for mounting a connection bridge of axles comprising an annular collar and in indexing key situated on the side and in proximity of the actuating lever and of the connecting two-part housing.

9. The protective device according to claim 8, wherein the clearance existing between the operating shaft and the bore of the sleeve is of about 1 mm.

10. The protective device according to claim 8 further comprising a wearing plate disposed at an inner side of the bore of the sleeve and extending over substantially the entire length of the bore; and operating cam for brake shoes and having an angular clearance angle alpha α, wherein the wearing plate covers a portion corresponding to the angular clearance alpha α of the operating cam of the brake shoes; and a reinforcing jacket disposed on the outer side of the sleeve in the area of the bushing and running over the entire circumference of the sleeve, wherein the reinforcing jacket is of a length slightly greater than the length of the bushing.

11. The protective device according to claim 10 wherein the wearing plate is furnished with a plurality of perforations and wherein the reinforcing jacket of the sleeve is furnished with a plurality of perforations, said perforations permitting an attachment of the wearing plate and of the reinforcing jacket to the sleeve by over-coating the perforations at a time of molding of the sleeve.

12. The protective device according to claim 10 further comprising wherein the sleeve, the wearing plate, the lubricator, and the indexing key of the sleeve have a common plane of symmetry relative to the connecting two-part housing.

13. The protective device according to claim 10 further comprising a tab forming an integral part of the sleeve, and wherein a second mounting means of the protective device at the connecting bridge of the axles is furnished by said tab; and wherein the sleeve the wearing plate, the lubricator, and the mounting tab have a common plane of symmetry at the connecting bridge of axles.

14. The protective device according to claim 13 further comprising wherein the sleeve, the wearing plate, the lubricator, and the indexing key of the sleeve have a common plane of symmetry relative to the connecting two-part housing; and wherein the wearing plate, the lubricator, and the indexing key of the sleeve are situated at the lower portion of the sleeve relative to the connecting two-part housing and wherein the tab provides for direct mounting of axles to the sleeve at the connecting bridge.

15. The protective device according to claim 14, wherein the bore of the sleeve has a center axis and wherein the shaft has a middle axis and wherein the center axis is upwardly offset relative to the mddle axis by a distance X substantially equal to one half of a clearance existing between the operating shaft and the bore of the sleeve; wherein the clearance existing between the operating shaft and the bore of the sleeve is of about 1 mm; and wherein the wearing plate is furnished with a plurality of perforations and wherein the reinforcing jacket of the sleeve is furnished with a plurality of perforations said perforations permitting an attachment of the wearing plate and of the reinforcing jacket to the sleeve by over-coating the perforations at a time of molding of the sleeve.

16. The protective device according to claim 8, further comprising a tab forming an integral part of the sleeve; wherein a second mounting means of the protective device at the connecting bridge of the axles is furnished by said tab.

* * * * *